UNITED STATES PATENT OFFICE.

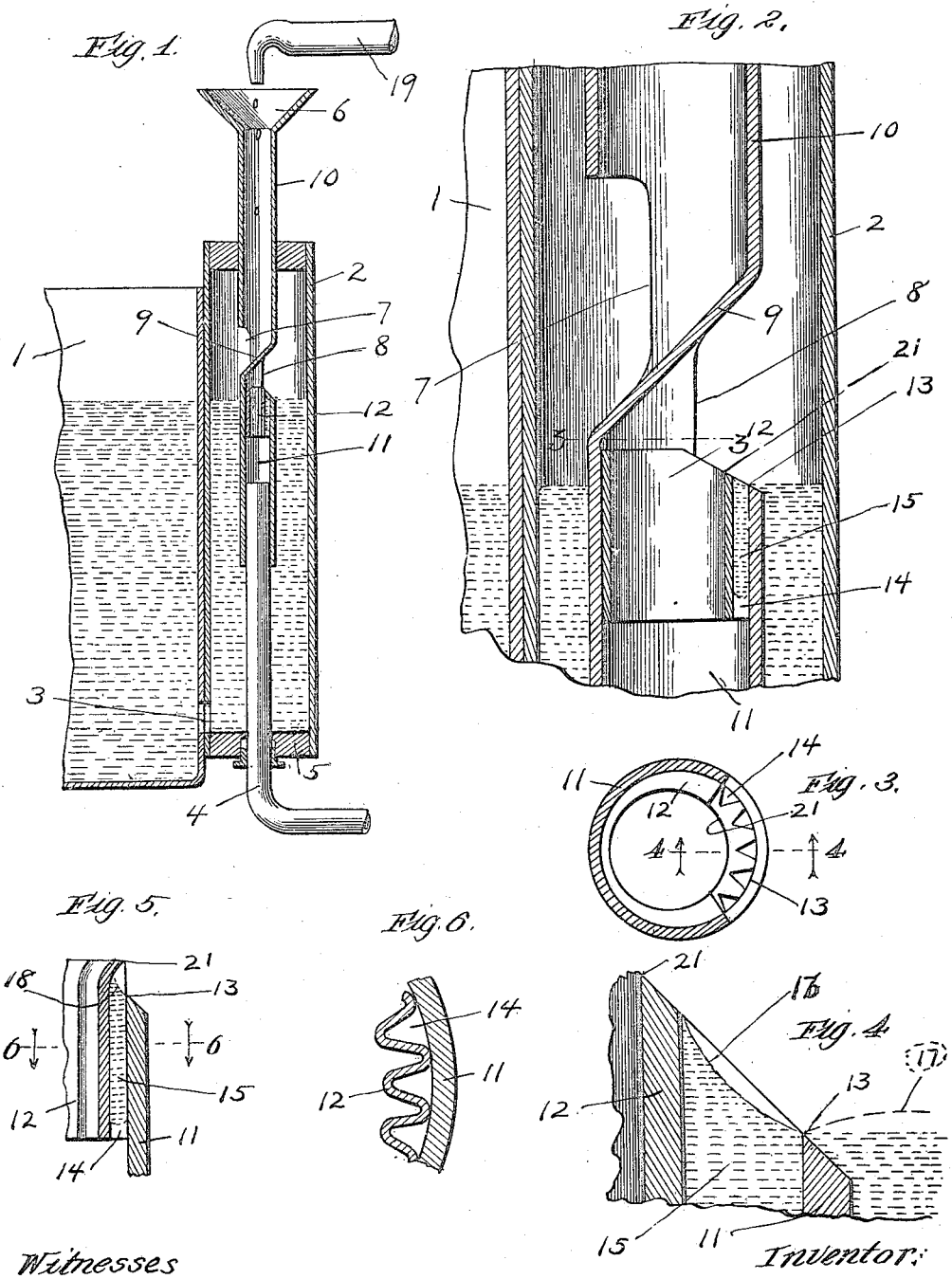

ACHILLES DE KHOTINSKY, OF CHICAGO, ILLINOIS, ASSIGNOR TO CENTRAL SCIENTIFIC COMPANY, OF CHICAGO, ILLINOIS, A CORPORATION OF ILLINOIS.

LIQUID-LEVEL REGULATOR.

1,225,416.  Specification of Letters Patent.  Patented May 8, 1917.

Application filed March 25, 1916. Serial No. 86,588.

*To all whom it may concern:*

Be it known that I, ACHILLES DE KHOTINSKY, a citizen of the United States, residing at Chicago, in the county of Cook and State of Illinois, have invented certain new and useful Improvements in Liquid-Level Regulators; and I do hereby declare the following to be a full, clear, and exact description of the invention, such as will enable others skilled in the art to which it appertains to make and use the same.

My invention relates to means for maintaining a constant level in a vessel containing liquid, its general objects being to provide simple, cheap and effective means for replenishing the liquid to compensate for loss by evaporation, and to maintain the level of the liquid with unusual precision at a pre-determined height. In various forms of physical and chemical apparatus, such as constant temperature water baths, it is often highly important that the liquid in the bath should be maintained at a constant level. Heretofore it has been customary for this purpose to provide a continuous supply of replenishing liquid at a rate somewhat greater than that at which the liquid in the bath is evaporated, thereby tending to raise the level, and to provide an overflow pipe positioned at the desired height so that the excess of liquid may be drained off through this pipe. In practice, the movements of the liquid due to convection, air currents and the like disturb the surface, thus varying the level and interfering with the constancy expected from the position of the overflow pipe. Moreover, the surface tension of the liquid will cause the latter to rise somewhat above the top of the overflow pipe before the lateral pressure of the excess of liquid is sufficient to overcome this surface tension, whereupon this excess flows into the pipe with a velocity which may be sufficient to reduce the level even below the mouth of the said pipe. In practice, and particularly if the liquid is relatively quiet, the variation in the level may easily amount to one or two millimeters, or an amount far in excess of that desired for chemical operations demanding a high degree of precision.

Moreover, the entering of the replenishing liquid commonly causes a disturbance in the liquid, varying somewhat with the height for which the overflow outlet is adjusted with respect to the inlet and always interfering with the desired constancy of the level.

My invention aims to provide means for preventing the mechanical disturbances in the body of the liquid from being communicated to the vicinity of the overflow outlet: to provide means for reducing the disturbance caused by the influx of the replenishing liquid to a substantially negligible quantity and to prevent even this disturbance from readily reaching the overflow outlet: to provide simple means for adjusting the height of the overflow outlet and for simultaneously therewith adjusting the point of influx of the replenishing liquid: to provide simple and extremely sensitive means for normally preventing an appreciable rise of the liquid above the overflow outlet: to provide less sensitive means for affording a rapid outlet for any large excess of liquid: and to provide ready access to the sensitive outlet controlling means for cleaning the latter. Further objects will appear from the following specification and from the accompanying drawings, in which Figure 1 is a fragmentary vertical section through a water bath equipped with my invention.

Fig. 2 is an enlarged view of a portion of Fig. 1 showing the disposition of the inlet and the outlet.

Fig. 3 is a horizontal section through Fig. 2 along the line 3—3.

Fig. 4 is an enlarged fragmentary vertical section through Fig. 3 along the line 4—4.

Figs. 5 and 6 are fragmentary vertical and horizontal sections through portions of an outlet tube equipped with an alternative design of auxiliary capillary tubes.

In accomplishing the purposes of my invention, I preferably connect both the inlet for the replenishing liquid and the outlet for the surplus of liquid not to the main container or bath 1, but to a relatively quite small auxiliary container 2 mounted at one side of the bath and connected to the latter by an opening 3. Extending upwardly into the container 2 is an outlet pipe 4, preferably mounted in a plug 5. Slidably mounted on the pipe 4 is a tube projecting above the bath and preferably terminating at its top in a funnel 6, which tube has an inlet opening 7 and an outlet opening 8 intermediate of its length and substantially opposite each other. Soldered into this tube is an inclined partition 9 which divides the tube into an upper or inlet portion 10 connecting the funnel 6 with the opening 7, and a lower or outlet portion 11 connecting the opening 8 with the pipe 4. Mounted within this lower portion and extending upward into the latter are capillary tubes preferably formed by soldering into the tube portion 11 a collar 12 presenting a series of sharp corrugations toward the side of the tube having the opening 8. Both this collar and the adjacent portion of the tube portion 11 are preferably inclined as shown in Figs. 1, 2 and 4, so that the liquid rising above the edge 13 of said tube portion will first reach the entrance to one or more of the capillary tubes 14 and thereafter will reach the edge 21 of the collar, over which latter edge the liquid may readily enter the tube portion 11. This collar 12 may be made of a tube having acute angled vertical slots in its outer surface, as in Figs. 2 and 3; or it may have sharply angled corrugations on one side, as in Fig. 6. In either case, the first excess of water flowing over the ledge 13 will enter the tubes 14, and owing to the diminutive size of the latter, each of these tubes will retain a relatively small column of liquid 15, which column owing to the capillary action of the angularly disposed sides will present an upper surface 16 sloping upward from the ledge 13.

When in use, the slidably mounted tube is moved to the position in which the ledge 13 corresponds to the desired level of the liquid, and a supply of replenishing liquid is fed in small drops through the funnel 6 from a suitable dropper 19. Each of these drops is intercepted by the inclined partition 9, which causes the relatively minute volume of this drop to be distributed through the liquid in the container 2 on the side opposite the overflow opening 8, thus causing a rise of the level in the container 2 with comparatively little disturbance of the liquid therein and with still less disturbance of the liquid in the bath 1. However, the liquids in the containers 1 and 2 will promptly find a common level, so that the said influx drops will compensate for the evaporation normally taking place in the bath 1. Any excess in the rate of influx over that required for maintaining the desired level will cause the liquid in the container 2 to rise above the ledge 13, and ordinarily the surface tension of the liquid would cause the latter to arch upward in the form of a meniscus at its top (as shown by the dotted line 17 in Fig. 4), thus permitting the level of the liquid to rise considerably beyond the ledge 13 before the excess is drained off through the overflow piping. However, as soon as the liquid reaches this ledge it is joined by the portion of the column 15 which extends above the said ledge, whereupon the weight of this column siphons off the liquid above the ledge 13, stopping again in the position of Fig. 2. By making the tubes 14 quite small in section and sharpening the ledge 13, I am able to provide an unusually sensitive control of the level in the auxiliary container 2; and, since the liquid in the main bath cannot respond instantaneously to even the minute disturbances caused by the entering drops of water and the occasional siphoning through the capillary tubes, I am able to maintain the level of the liquid in a bath of ordinary size constant within such minute fractions as a hundredth of a millimeter. However, this sensitive control does not interfere with the ready outflow of any large excess of liquid over the upper ledge 21, nor is its sensitiveness in any way affected by raising or lowering the sliding tube so as to vary the desired constant height of the liquid.

While I have illustrated and described my invention as applied to a water bath, it will be evident that it might be adapted equally well to other types of containers and to other liquids. Moreover, by raising the sliding tube entirely out of the auxiliary container, access may readily be had to the capillary tubes for cleaning the same. In any case, the capillary tube formations must be so proportioned that the weight of the normally retained column 15 of liquid will not exceed the force of the capillary action. The height at which the upper surface of this column projects beyond the ledge 13 and presents a surface ready to merge into the surface of the liquid in the container 2, and the angle at which the said upper surface of the column is presented may both be varied considerably by altering the shape and size of the adjacent parts. For example, Fig. 5 shows an embodiment in which the collar 12 is flared outwardly at its upper end, thus presenting a column top 18 disposed almost vertically. So also, it will be obvious that many other modifications might be made without departing from the spirit of my invention, hence I do not wish to be limited to the construction herein disclosed.

I claim as my invention:

1. Apparatus for maintaining liquid in a container at a constant level including a relatively small auxiliary receptacle connected to said container near the bottom thereof, and replenishing and overflow means both connected to said auxiliary container, said means being simultaneously adjustable to vary the height of the operative connections between said auxiliary container and said replenishing and overflow means while maintaining said replenishing means in predetermined relation to the surface of the liquid as determined by said overflow means.

2. Apparatus for maintaining the level of liquid in a container including a vertical tube with oppositely directed lateral openings, a partition dividing said tube into sections leading respectively from each opening to the upper and lower ends of the tube, an outlet connected to the lower end of the tube, said tube being vertically adjustable whereby the level of the liquid in said container is varied and the predetermined relation of said partition to the surface of the liquid is maintained.

3. Apparatus for maintaining the level of liquid in a container, including an outlet pipe for said liquid, and means associated with the entrance to and wholly contained within said pipe for rupturing the surface tension of liquid rising in the container above the said entrance.

4. Apparatus for maintaining the level of liquid in a container including means for supplying replenishing liquid, an overflow outlet, an inlet for the replenishing liquid, said outlet and inlet being oppositely directed with respect to said container and simultaneously adjustable to maintain said inlet in predetermined relation to the surface of the liquid as determined by said outlet.

5. Apparatus for maintaining the level of liquid in a container, including a vertical tube with oppositely directed lateral openings, a partition dividing said tube into sections leading respectively from each opening to the upper and lower ends of the tube, means for supplying replenishing liquid to the upper end of the tube, and an outlet connected to the lower end of the tube.

6. Apparatus for maintaining the level of liquid in a container, including an outlet pipe connected to said container and presenting an entrance disposed at the desired level, and capillary means associated with and wholly contained within the outlet pipe for rupturing the surface tension of liquid disposed in the container above the lower edge of said entrance.

7. Apparatus for maintaining the level of liquid in a container, including an outlet pipe connected to said container and presenting an entrance disposed at the desired level, and capillary means associated with the outlet pipe for rupturing the surface tension of liquid disposed in the container above the lower edge of said entrance, said capillary means including a capillary tube mounted in said pipe and projecting above the lower edge of the said entrance.

8. Apparatus for maintaining the level of liquid in a container, including an outlet pipe connected to said container and presenting an entrance disposed at the desired level, and capillary means wholly contained within said outlet pipe for presenting a column of liquid in the outlet pipe with the upper surface of said column disposed above the lower edge of said entrance.

9. Apparatus for maintaining the level of liquid in a container, including an outlet pipe connected to said container and presenting an entrance disposed at the desired level, and a collar mounted in said pipe and presenting vertical recesses toward the pipe adjacent to said entrance, said recesses coöperating with the adjacent wall of the pipe to form capillary tubes extending above the lower edge of the entrance.

10. Apparatus for maintaining the level of liquid in a container, including an outlet pipe connected to said container and presenting an entrance disposed at the desired level, the lower edge of said entrance sloping upward from the container to the bore of the pipe, and means associated with said pipe for presenting a column of liquid in the pipe with the upper surface thereof sloping upwardly substantially in continuation of the aforesaid slope.

11. Apparatus for maintaining the level of liquid in a container, including an outlet pipe presenting a main opening at some distance above the said level, and capillary means associated with and wholly contained within the overflow pipe for normally preventing the level of the liquid from reaching the said main opening.

12. Apparatus for maintaining the level of liquid in a container, including an outlet pipe presenting a main opening at some distance above the said level, a capillary tube mounted entirely within said pipe and positioned for conducting liquid from the container into said pipe when said liquid has risen above the said level, and capillary means for normally maintaining a column of liquid in the siphon tube.

13. The combination with a vessel containing liquid, of a capillary overflow pipe extending above the level of the liquid and normally retaining liquid in said pipe with the upper surface thereof above said level.

14. The combination with a vessel containing liquid, of a capillary overflow pipe extending above the level of the liquid and normally retaining liquid in said pipe with the upper surface thereof sloping upward from the operative juncture of said overflow pipe with the liquid.

15. The combination with a vessel containing liquid, of overflow means connected thereto at a height corresponding to the desired level of the liquid, said means including a pair of walls separated by substantially vertical capillary passages, one of said walls extending above the said level.

16. The combination with a vessel containing liquid, of overflow means connected thereto at a height corresponding to the desired level of the liquid, said means including a pair of walls, one of said walls being sharply corrugated and extending beyond said level, the spaces between said walls forming capillary ducts retaining liquid with the surface of the latter disposed above the said level.

17. The combination with a container, of an overflow pipe having a substantially horizontal edge at its opening, of capillary means associated with said pipe for maintaining liquid with its upper surface disposed above said edge, and means for simultaneously raising or lowering said pipe and means with respect to the container.

A. DE KHOTINSKY.

Witnesses:
WM. O. BELT,
M. A. KIDDIE.

Copies of this patent may be obtained for five cents each, by addressing the "Commissioner of Patents, Washington, D. C."